United States Patent Office 2,902,921
Patented Sept. 8, 1959

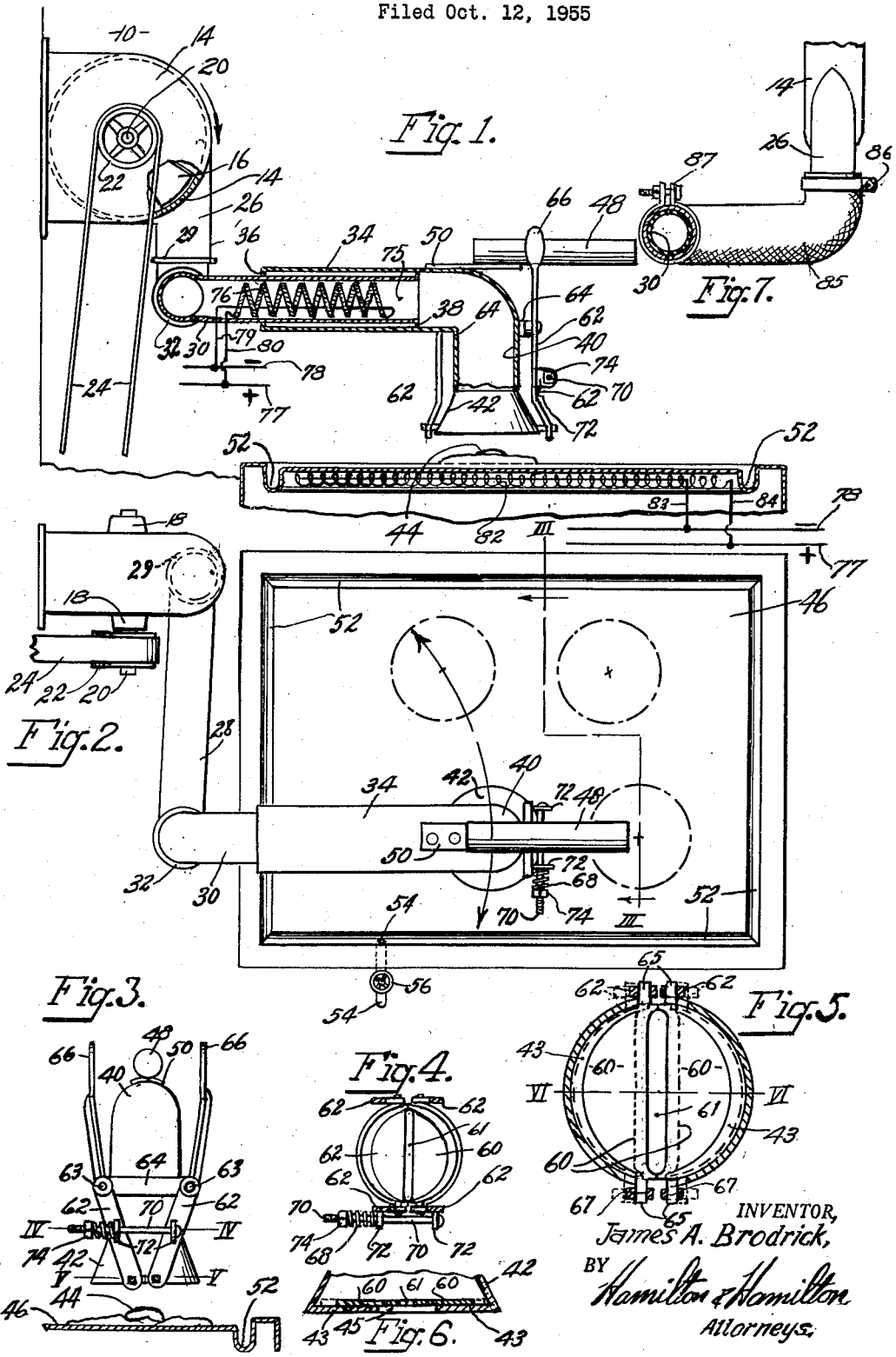

2,902,921
MEANS FOR SEPARATING GREASE FROM COOKED FOODS

James A. Brodrick, Kansas City, Mo.

Application October 12, 1955, Serial No. 540,091

1 Claim. (Cl. 99—352)

This invention relates to improvements in means for removing grease from cooked foods and particularly to the removal of grease from fried foods. It is a very common practice to fry eggs with ham or bacon whereby an objectionable amount of grease will accumulate on the cooked food.

Before serving this fried food it is desirable to remove the major portion of the liquified grease and juice from the cooked food and use them in the preparation of dressings and gravies, etc.

This degreased food is more tasty and much healthier for the consumer.

Other objects of the present invention are simplicity and economy of construction, ease and efficiency of operation, and adaptability for use with many types of fried foods.

With these objects in view as well as other objects which will appear during the course of the specification, reference will be had to the drawing wherein:

Fig. 1 is an elevational view of a cooking means embodying this invention.

Fig. 2 is a plan view of the cooking means shown in Fig. 1.

Fig. 3 is an elevational end view of the nozzle portion of the cooker with parts omitted taken on line III—III of Fig. 2.

Fig. 4 is a sectional view taken on line IV—IV of Fig. 3.

Fig. 5 is an enlarged sectional view taken on line V—V of Fig. 3.

Fig. 6 is a sectional view taken on line VI—VI of Fig. 5, and

Fig. 7 is a view of a modified portion of the connection between the blower and the nozzle which comprises a single pliable tube which may be easily positioned to permit a universal connection between the said blower and nozzle.

Reference will now be had to the drawing wherein like reference characters will be used to indicate similar parts throughout the several views and the numeral 10 designates a centrifugal blower suitable for delivering compressed air to a nozzle to blow liquid grease from food being cooked. Blower 10 has a housing 14 in which fan 16 is rotatably mounted in bearings 18 on a shaft 20. Shaft 20 carries pulley wheel 22 which is driven by a belt 24 which in turn is driven by a motor not shown. Compressed air is driven by fan 16 downwardly through depending tube 26 then to an elbow 28 which is mounted thereto for horizontal pivotal swinging movement at 29.

The other end of 28 is pivoted to nozzle housing 30 at 32 for swinging movement as indicated by arrows. A telescoping section 34 encompasses the outer end of nozzle housing 30 and has an inwardly turned flange 36 which when the section 34 is extended on housing 30 will engage the outturned flange 38 of housing 30, which limits its extension.

Section 34 has a downwardly turned section 40 having an outwardly flared end 42 which serves to direct the hot air being delivered to the cooked food 44 positioned on a griddle 46 positioned below said nozzle. Nozzle 42 has a planar bottom plate 43 having a relatively wide open central section 45.

It is necessary for the operator to properly position the stream of hot air from the heater to the food 44 so as to blow the accumulated hot grease from the cooked food. A handle 48 secured to the top side of section 40 by means of strap 50 serves as a hand grip whereby the operator may properly position the air draft over the cooked food. By this handle means the hot air nozzle may be readily positioned to remove grease from the food positioned any place on the griddle. It is quite apparent that with the joints as described the operator may readily have universal movement of the nozzle to any desired position on the griddle. Griddle 46 has a continuous trough 52 extending about the griddle adjacent its outer edges. A drain pipe 54 positioned below at the lower portion of trough 52 is provided with a cutoff valve 56 by means of which grease and juices may be drained from the trough for use. The flow of air may be varied to the cooked food by slide valve 60 shown in the minimum open position in Fig. 5 in solid lines and in the maximum open position in dotted lines. Valves 60 are carried by arms 62 pivotally carried at 63 by cross bars 64 fixed to nozzle 42. These arms 62 at the outer end extend upwardly to present finger grips 66 adjacent hand grip 48 whereby they may be manually operated to regulate the valve openings against the action of compression spring 68 mounted on a rod 70 slidably mounted in ears 72. The tension of spring 68 may be varied by adjusting nut 74 on the threads of rod 70.

The valve members 60 each have a protruding tongue 65 at their opposite ends to engage slots 67 formed in the lower end of arms 62. As the operator compresses finger grips 66, the spring 68 will be compressed and the valve opening 61 will be widened to increase the valve opening to control the speed of hot air to the cooked food 44. Chamber 75 in tube 30 is provided with an electric heating coil 76 which is energized by feed wires 77 and 78 through connecting wires 79 and 80. Heating coil 82 serves to heat griddle 46 from feed wires 77 and 78 throughout connecting wires 83 and 84.

As shown in Fig. 7 a pliable tube 85, which is susceptible to universal movement, is slipped over tube 26 leading from the blower and is secured thereto by means of clamp 86. The other end of tube 85 is secured to chamber tube 30 by means of clamp 87. This is simpler and less expensive means than is shown in the present form and would serve the purpose of a universal connection whereby the nozzle may be properly positioned over the food.

Suitable control switches for these electric circuits are provided but not shown.

It is evident that the operator may apply hot air from this cooking device to the food in such a manner that the food will be properly cooked and degreased. Furthermore, it is intended that the operator may apply any amount of heat to the food whereby said food such as eggs may be further cooked or seared after the liquid grease is driven therefrom.

What I claim as new and desire to protect by Letters Patent is:

An apparatus for use in conjunction with a food frying apparatus including a horizontal heated griddle adapted to fry food on the upper surface thereof, said apparatus comprising a blower adapted to be mounted in fixed relation to said griddle, a conduit connected to said blower to receive air therefrom and extending generally horizontally over said griddle, said conduit comprising a plurality of rigid sections successively interconnected for relative pivotal movement about vertical axes, at least one of said conduit sections being longitudinally extensible, whereby the discharge end of said conduit may be moved freely over the entire area of said griddle, a heating element mounted in said conduit and operable to heat air passing therethrough, and a manually adjustable nozzle interconnected with said conduit at the discharge end thereof and positioned to direct air downwardly toward said griddle.

References Cited in the file of this patent

UNITED STATES PATENTS

| | | |
|---|---|---|
| 620,842 | Elliot | Mar. 7, 1899 |
| 1,375,548 | Barnes | Apr. 19, 1921 |
| 2,096,023 | Albertson | Oct. 19, 1937 |
| 2,162,019 | Johnson | June 13, 1939 |
| 2,164,265 | Wilson | June 27, 1939 |
| 2,305,056 | Austin | Dec. 15, 1942 |
| 2,362,757 | Lang | Nov. 14, 1944 |
| 2,410,762 | Tunley | Nov. 5, 1946 |
| 2,623,234 | Brown | Dec. 30, 1952 |

FOREIGN PATENTS

| | | |
|---|---|---|
| 575,783 | Great Britain | Mar. 5, 1946 |